United States Patent [19]

Sexton

[11] Patent Number: 4,978,544

[45] Date of Patent: Dec. 18, 1990

[54] FLOUR-BASED FOODSTUFFS WITH IMPROVED TEXTURE

[75] Inventor: James E. Sexton, Cincinnati, Ohio

[73] Assignee: Mallinckrodt, Inc., St. Louis, Mo.

[21] Appl. No.: 216,032

[22] Filed: Jul. 7, 1988

[51] Int. Cl.⁵ .............................................. A21D 2/00
[52] U.S. Cl. ................................... 426/243; 426/549; 426/556
[58] Field of Search ............... 426/241, 242, 243, 549, 426/556

[56] References Cited

U.S. PATENT DOCUMENTS

| | | | |
|---|---|---|---|
| 3,256,101 | 6/1966 | Arns | 426/241 |
| 3,694,228 | 9/1972 | Hochhauser | 426/241 |
| 4,396,635 | 8/1983 | Roudebush et al. | 426/243 |
| 4,463,020 | 7/1984 | Ottenberg | 426/243 |
| 4,560,559 | 12/1985 | Ottenberg | 426/243 |
| 4,847,104 | 7/1989 | Benjamin et al. | 426/19 |

FOREIGN PATENT DOCUMENTS 46-30772 9/1971 Japan .
48-16179 5/1973 Japan .

Primary Examiner—Donald E. Czaja
Assistant Examiner—Mary S. Mims
Attorney, Agent, or Firm—Wood, Herron & Evans

[57] ABSTRACT

Flour-based foodstuffs capable of forming a desirable flaky texture upon cooking in a microwave oven are produced by separately adding throughout the flour an effective amount of a protein having low affinity for water to make the dough.

19 Claims, No Drawings

FLOUR-BASED FOODSTUFFS WITH IMPROVED TEXTURE

FIELD OF THE INVENTION

This invention relates to flour-based microwavable foodstuffs having improved texture and mouth feel.

BACKGROUND OF THE INVENTION

A number of edible products found on the market today contain or are comprised of flour-based foodstuffs. Such foodstuffs exist as breads, pizza dough, and bakery goods, but also include coatings and breading for meat, vegetable and fruit products. Foodstuffs employed as coatings and breading are used in part to carry additional flavoring to the coated food product as well as to impart a desirable mouth feel and retain moisture. It is desirable that the flour-based foodstuffs have a texture which is firm, and yet flaky or crunchy depending on the intended application. Flour-based foodstuffs which are dense, watery, limp, or tough are considered unappetizing by the consumer and are thus commercially unacceptable. Typically, a flaky or crunchy texture in a flour-based foodstuff is formed by the addition of components, such as butter, shortening and other fat based materials into the flour-based foodstuffs. The result is that the uncooked dense flour-based foodstuff in the presence of convection cooking heat expands and dries to form discrete layers of flour-based material and thus creates a flaky or crunchy texture.

The problem of creating a flaky or crunchy texture in a flour-based foodstuff using a microwave oven is more difficult to solve. In contrast to a typical convection-type oven, the heat for cooking in a microwave oven is generated inside the flour-based foodstuff rather than above the surface of the food-stuff. Heat is supplied to the entire volume of the flour-based foodstuff in a microwave oven rather than having the heat being applied only at the surface using the convection oven. Heating in the microwave is thus more uniform, and the temperature needed to cook is consequently lower, typically not exceeding the boiling point of water which is 212° F. (100° C.). The flaky or crunchy baked flour products formed in the convection oven by application of relatively high heat and evaporation of water do not form in a microwave oven. Rather, a flour-based foodstuff designed for heating in a convection oven will result in the formation of a mushy, pasty, unappetizing product when heated in a microwave oven.

This problem of formation of an unappetizing cooked flour-based foodstuff becomes more difficult to remedy when an aqueous flour-based foodstuff is to be frozen and then thawed before cooking. One reason for the problem is that the water in the foodstuff is somehow chemically or physically sorbed into the flour-based component on storage. Further, the operation of freezing a flour-based foodstuff containing water causes the liquid water to form ice crystals having a larger volume than the water itself. Upon thawing and cooking, the ability of the foodstuff to form the flaky and crunchy texture is even further diminished. Presently available flour compositions are incapable of forming upon microwaving a flaky or crunchy texture.

It is known with reference to Yamamoto U.S. Pat. No. 3,840,676 to use a combination of zein and prolamine to coat the surface of a foodstuff, such as partially baked bread, for the purpose of binding the foodstuff and protecting it against oxidation and putrefication. When combined, the amino acid and prolamine undergo a gelation reaction and thus form a film on the surface of the coated foodstuff. Yamamoto claimed the process improved the color and luster of the bread surface and also decreased water loss from the bread.

SUMMARY OF THE INVENTION

The invention is directed to a flour-based foodstuff which has an improved firm texture, especially when cooked using microwave radiation. According to this invention, flour-based foodstuffs demonstrating the improved texture upon microwave cooking contain in the foodstuff a protein having a low affinity for water upon storage, especially frozen storage. The protein must be in the mass in an amount effective to produce a flaky or crunchy texture under the cooking conditions produced by microwave radiation. The protein having the required low affinity for water upon storage employed in this invention is exemplified by the class of proteins known as prolamines.

It has been found that the separate addition of an effective amount of low water-affinity zein or soy isolate protein in uniform mixture throughout a flour-based mixture, with or without a leavening agent, forms a cooked foodstuff which has a very desirable firmness. The novel foodstuffs of this invention have utility in various applications. It has also been found that these novel foodstuffs when formed into a dough with water can be cooked using microwave radiation to form a finished foodstuff having a flaky or crunchy texture similar to that found in other flour-based foodstuffs cooked using a convection oven. Surprisingly, the compositions of this invention may be frozen and microwaved in their frozen state to prepare very delectably firm, flaky or crunchy products. The microwavable properties of these compositions solve a long outstanding problem and will enable wider utilization of diverse microwavable products such as pot pies, fruit pies, biscuits, breading and so forth.

Firmness throughout the foodstuff is improved by the incorporation of an effective amount of the protein having low affinity for water upon storage. It has been found that a particular class of such proteins prevent the disadvantages of water sorption upon storage, especially frozen storage. The exact mechanism is not understood, but the empirical results speak for themselves. The texture improvement in the microwave cooked product whether by the creation of a flakier, crunchier foodstuff or by the formation of a firmer foodstuff having improved body, appears primarily a function of the level of low water-affinity protein added to the foodstuff ingredients. The type of firmness improvement will further depend on the entire composition of the foodstuff. For example, the ingredients used to conventionally prepare a turnover crust having a leavening agent optimally produce a product which is characterized by its flakiness, while a chicken batter coating produces a crunchy texture. A pizza dough formulation produces a chewy, yet firm, texture.

It has also been found that an effective amount of a metal ion, i.e., Na, Ca, K (and other alkali or alkaline earth metal ions) and the like metal ions, in conjunction with the low water-affinity protein produces the superior effect of crispiness and organoleptic properties. It is believed that an effective amount of the Na ion (or Ca, K, etc., metal ions) absorbs microwave energy thereby assisting in the heating of crust to enhance crispiness.

The amount of such ions will vary with the composition of the entire crust.

DETAILED DESCRIPTION OF THE INVENTION

In its broader aspects the invention is directed to a flour-based foodstuff consisting essentially of an intimate mixture of flour and a protein having low affinity for water upon storage throughout its mass, said protein in an amount adapted to obtain, upon blending with water and cooking, a firm texture of said foodstuff. The protein having affinity for water upon storage is a prolamine derived from any of several food grains. The low water-affinity proteins derived from corn, soybeans, wheat or rye, and barley are known respectively as zein, soy isolate, gliadin, and hordein. Prolamines are obtained from gluten, which is a component of various cereal based flours. Flour consists essentially of a mixture of gluten and starch, and the prolamine is a component of the gluten having low affinity for water upon storage. Prolamines are separated from gluten generally by extraction with alcohol such as ethyl and isopropyl alcohol. In the pure state, prolamines exist as light-colored powders.

The flour-based foodstuff containing an effective amount of the protein having low affinity for water upon storage is especially adapted for cooking upon application of microwave energy. The cooked product has a desirable flaky or crunchy texture. Further, as mentioned, the foodstuff containing the protein having low affinity for water is capable of being frozen and stored at a temperature below 32° F. (0° C.). After thawing, the foodstuff may be cooked directly using microwave energy to produce a cooked foodstuff having a flaky or crunchy texture. Remarkably, the improved texture obtained by cooking the foodstuff of this invention using microwave energy is not adversely affected by freeze/thaw cycles.

While not desiring to be bound by theory, it is believed that foodstuffs containing effective amounts of protein having low affinity for water upon storage have acceptable texture and freeze-thaw properties because the protein acts as a moisture absorption or adsorption inhibitor for the flour. The prolamine added to the flour is believed to coat or associate itself with the components of the grain to make them resistant to water absorption and to deleterious freeze-thaw effects due to the water. The flour grains thus retain their integrity in water and during freezing, and the resulting cooked foodstuff has a desirable firmness, i.e., flaky or crunchy texture of acceptable firmness and perceived palatable dryness. After freezing, the foodstuff of this invention may be stored in the frozen state for at least up to three months without adverse effect. The properties of flakiness and crunchiness are analogous in that both depend on formation of individual layers of cooked foodstuff. The foodstuff fractures along the layer lines when force is applied, as by manual breaking of the foodstuff or by the grinding action of the teeth. Thus, firmness as directed to foodstuffs having a flaky texture also pertains to foodstuffs with a crunchy texture.

It has been found that the effect due to the low water-affinity protein is also observed in foodstuffs cooked in conventional convection-type ovens. As indicated above, however, the convection oven serves to remove water from the cooking foodstuff and thus more actively contributes to the creation of a desirable texture than the microwave oven. Thus, formulation of a foodstuff containing low water-affinity protein for cooking in a convection oven must be altered in order to provide finished products which are not overly dry or crumbly.

It has further been found that the effectiveness of the protein having low affinity for water upon storage in producing a flaky texture in a flour-based foodstuff varies with the cereal grain from which the protein is extracted. The variation is due to the specific composition of the low water-affinity protein found in the various cereal grains. Thus, zein, derived from corn, is more effective than soy isolate, the protein derived from soybeans. Both of these proteins in turn perform more effectively than gliadin, the protein derived from wheat. Though the proteins vary in effectiveness based upon the feed stock grain, all demonstrated utility in producing a flour-based foodstuff having a flaky or crunchy texture.

OPERATING EXAMPLES

The following detailed operating examples illustrate the practice of the invention in its most preferred form, thereby enabling a person of ordinary skill in the art to practice the invention. The principles of this invention, its operating parameters and other obvious modifications thereof will be understood in view of the following detailed procedure.

OPERATING EXAMPLE I

A breading composition for coating chicken was prepared using the following materials.

TABLE 1

| Chicken Breading | |
|---|---|
| Component | Weight (g) |
| 30% Solution of Zein in Ethanol (wt:wt) | 18 |
| Corn Flour | 9 |
| Methyl Cellulose | 2 |
| "FRO-DEX" 10 | 22 |
| Stearine | 40 |
| Water | 10 |
| | 101 Grams |

The breading composition was prepared by mixing the dry components, corn flour, methyl cellulose and "FRO-DEX" 10 until homogeneous. "FRO-DEX" 10 is a corn-derived maltodextrin, with dextrose equivalent of 10; American Maize Products. The water was then combined with the ethanol solution of zein, and the dry blend was added with mixing. The stearine component, having a melt point of 145° F, was then melted and stirred into the component mixture. The total mixture was then cooled, chopped in a Waring Blender, and combined with Japanese crumbs. Japanese crumbs are a type of bread crumb characterized by a larger size and improved stability over conventional bread crumbs. This breading mix was then coated onto chicken to produce a coated meat product having a weight ratio of about 30% breading to about 70% chicken.

The breaded chicken was precooked by frying in an oil bath for 15-30 seconds at 375° F. The precooked breaded chicken was then quick frozen at −20° F for a minimum test storage period of 24 hours.

The frozen chicken was subsequently thawed and cooked in a microwave oven. The cooked breading component had a crunchy texture without suggestion of wateriness or mushiness. The chicken had an acceptable flavor and appearance.

OPERATING EXAMPLE II

The breading composition of Table 1, but without the zein component, was prepared and coated onto chicken using the same procedure as that described in Example I. The coated chicken was then precooked by frying, frozen, thawed, and then cooked in a microwave oven. The chicken had an acceptable flavor and appearance, but the breading component was not crunchy. Instead, the breading component had a mushy texture, was wet and had an unpleasant mouth feel.

OPERATING EXAMPLE III AND IV

Two pizza dough compositions were prepared by combining the following ingredients.

TABLE 2

| | Pizza Dough Weight (g) | |
|---|---|---|
| Component | III | IV |
| Red Winter Wheat Flour | 571.1 | 631.0 |
| Water | 353.4 | 353.4 |
| Vegetable Oil | 9.5 | 9.5 |
| Sugar | 14.0 | 14.0 |
| Yeast | 6.0 | 6.0 |
| Salt | 7.0 | 7.0 |
| Crust Agent | 60.0 | — |
| | 1021.0 | 1020.9 |

The crust agent is a blend of approximately 46.2% soy isolate, 12.4% yeast autolysate, 10.9% flour, 7.4% maltodextrin, 6% chicken paste, 5.5% white corn flour, 3.9% butter flavor, 3.8% fat coated sodium bicarbonate, 2.7% sodium acid pyrophosphate, and 1.2% yeast flavor.

The dry components of Table 2 were combined and mixed in a commercial mixer unit to form a uniform blend. To this blend was added the oil with mixing, then the water at low mixing speed until the flour became wet. The total mixture was then kneaded at medium to high speed for about 5 or 6 minutes. The dough was let to stand for about 3 minutes, followed by formation of the shaped dough base. The shaped dough was then prebaked at about 400° F for 5 to 6 minutes, quick frozen at −20° F. for a minimum test storage period of 24 hours and then covered with a conventional pizza topping composition. The frozen storage period may extend up to 2 weeks. The frozen pizzas were then cooked in a microwave oven. The pizza dough composition containing soy isolate (III) produced a crust which was firm and had an acceptable mouth feel. The dough composition which had no added soy isolate (IV) produced an unacceptable wet, doughy crust.

OPERATING EXAMPLES V AND VI

Batter coatings for chicken nuggets were prepared by combining the ingredients in the table below.

TABLE 3

| Batter Coating | |
|---|---|
| Component | Volume |
| All Purpose Flour | 1 cup |
| Sugar | 1 tbsp. |
| Baking Powder | 1½ tsp. |
| Salt | ¼ tsp. |
| White Pepper | ¼ tsp. |
| Chili Powder | ½ tsp. |
| Eggs (beaten) | 2 |
| Milk | ½ cup |
| Butter (melted) | 1 tsp. |

The dry components, flour, sugar, baking powder, salt, white pepper and chili powder, were combined to form a uniform blend. Then, the melted butter was combined with milk, followed by addition of the beaten eggs to form a liquid blend. The dry uniform blend was then combined with the liquid blend and mixed to produce a uniform batter. The batter was then divided into two equal parts. One part was weighed, and to that part was added 6% by weight a breading flavor having the same components as the crust agent of Table 2 and therefore containing about 46% by weight soy isolate. The batter containing soy isolate (V) and the batter without soy isolate (VI) were used to coat chicken pieces. The coated chicken pieces were precooked by frying in oil at 375° F for 15-30 seconds, frozen, thawed, and then cooked in a microwave oven. The chicken nugget batter containing soy isolate (V) produced a cooked coating with a firm, crunchy texture and good mouth feel. The batter without soy isolate (VI) was mushy after microwave cooking.

OPERATING EXAMPLES VII THROUGH XVI

Fruit and pot pies containing a covering of a flour-based foodstuff were prepared. The pie covering formulations are listed below.

TABLE 4

| Pie Covering | |
|---|---|
| Component | Volume |
| All-Purpose Flour | 1 cup |
| Shortening | ⅓ cup |
| Salt | ½ tsp. |
| Water | 2-3 tbsp. |
| Crust Agent (selected from Table 5) | 6% by weight of above components |

TABLE 5

| | Crust Agent Weight (g) | | | | | | | | |
|---|---|---|---|---|---|---|---|---|---|
| Component | VII | VIII | IX | X | XI | XII | XIII | XIV | XV |
| Maltodextrin | 196 | 190 | 178 | 182 | 182 | 183 | 124 | 185 | 184 |
| Zein | 216 | 210 | 196 | 400 | — | — | — | — | — |
| Flour | 314 | 305 | 285 | 45 | 291 | 292 | — | — | — |
| Butter Flavor | 167 | 190 | 244 | 227 | 177 | 143 | 177 | 146 | 144 |
| Baking Powder | 78 | 76 | 71 | 109 | 73 | 72 | 73 | — | — |
| Sodium Bicarbonate | 20 | 19 | 18 | 27 | 18 | — | 18 | 38 | — |
| Calcium Chloride | 10 | 10 | 9 | 9 | 9 | — | 9 | — | — |
| Soy Isolate | — | — | — | — | 250 | 251 | 599 | 621 | 614 |
| Fat Coated Sodium | — | — | — | — | — | 59 | — | — | 58 |

TABLE 5-continued

| Component | Crust Agent Weight (g) | | | | | | | | |
|---|---|---|---|---|---|---|---|---|---|
| | VII | VIII | IX | X | XI | XII | XIII | XIV | XV |
| Bicarbonate | | | | | | | | | |

Baking powder was a commercial blend of maltodextrin, sodium bicarbonate, sodium acid pyrophosphate and inert materials to improve the flow properties of the powder.

The crust agent of Table 5 was prepared by combining the dry components, which includes all the listed materials with the exception of the flavor component, which is a combination of one or more organic-soluble flavors in a fat base. After the dry components were combined and then blended for about 7 minutes, the flavor component was added. The mixture was then further blended for about 45 minutes. The resulting uniform mixture was passed through a 10 mesh screen and readied for incorporation into the pie covering formulations.

The pie coverings were prepared according to the formula in Table 4 by combining the flour, salt, and crust agent and mixing until uniform. The water was then added to the dry mixture with additional mixing to ensure equal distribution of the water. Finally the shortening was folded into the mixture and mixed until a uniform dough was obtained.

Crust agent examples VII through XII were combined with the pie covering components to form pot pie crust coverings. The pot pie filling was chosen from a group of commercially available diced meat/vegetable or diced chicken/vegetable fillings. Provided in Table 6 below are representative meat and chicken fillings for use as pot pie fillings.

TABLE 6

| Chicken Filling | (% by wt) | Beef Filling | (% by wt) |
|---|---|---|---|
| Chicken Broth | 37% | Beef Broth | 37% |
| Chicken Meat | 25 | Beef Pieces | 25 |
| Peas | 14 | Peas | 14 |
| Carrots | 14 | Carrots | 14 |
| Potatoes | 5 | Potatoes | 5 |
| Starch | 1.65 | Starch | 1.65 |
| Flavor | 1.00 | Flavor | 1.00 |
| Salt | 0.60 | Salt | 0.60 |
| Non-fat dry milk | 0.40 | Non-fat dry milk | 0.40 |
| Sugar | 0.50 | Sugar | 0.50 |
| Monosodium Glutamate | 0.40 | Monosodium Glutamate | 0.40 |
| Hydrogenated Vegetable Oil | 0.40 | Hydrogenated Vegetable Oil | 0.40 |
| Caramel Color | 0.03 | Caramel Color | 0.03 |
| Turmeric | 0.02 | Turmeric | 0.02 |
| | 100.0% | | 100.0% |

Crust agent examples XIII through XV were incorporated with the pie covering components to produce fruit pie crust coverings. The specific fruit filling composition may be of cherry, apple or peach composition in aqueous sugar base. Provided in Table 7 below is a representative cherry fruit filling for use as a pie filling.

TABLE 7

| Cherry Fruit Filling | (% by wt) |
|---|---|
| Dark Sweet Cherries | 40.0 |
| Water | 33.26 |
| High Fructose Corn Syrup | 20.00 |
| Granular Sugar | 3.00 |

TABLE 7-continued

| Cherry Fruit Filling | (% by wt) |
|---|---|
| Modified waxy maize starch | 2.50 |
| Sodium Alginate | 0.89 |
| Salt | 0.15 |
| Potassium sorbate | 0.10 |
| Citric Acid, anhydrous | 0.10 |
| FD&C Red #40 | to suit |
| | 100.0% |

An example XVI, containing the pie covering components of Table 4 with no crust agent was run as a comparison.

After formulation of the pie coverings, each pie corresponding to the crust agent examples was then frozen for a minimum of 24 hours. The frozen pies were then removed directly to a microwave oven and individually cooked. The pot pies were cooked for about 9 to 10 minutes at full microwave power, while the fruit pies were cooked for about 6 to 7 minutes at full power.

The pies containing zein or soy isolate had flaky crusts after only microwave cooking, in both the pot pie and fruit pie configurations. Example XVI produced without any added low water-affinity protein formed a doughy, mushy pie covering after microwave cooking.

OPERATING EXAMPLES XVII THROUGH XX

To further demonstrate the beneficial effects due to the use of a low water-affinity protein upon storage in flour-based microwave foodstuffs, pot pie crusts were prepared using protein with leavening agents, using protein without leavening agents, and using neither protein nor leavening agents.

Table 8 below lists the components for the various formulations.

TABLE 8

| | (% by wt) |
|---|---|
| Pot Pie Crust XVII (no protein/no leavening) | |
| Flour | 52.0 |
| Salt | 1.5 |
| Dextrose | 2.5 |
| Hydrogenated Shortening | 26.0 |
| Water | 18.0 |
| | 100% |
| Pot Pie Crust XVIII (protein/no leavening/ additional salt) | |
| Flour | 46.0 |
| Soy Protein | 5.75 |
| Salt | 1.75 |
| Dextrose | 2.5 |
| Hydrogenated Shortening | 26.0 |
| Water | 18.0 |
| | 100% |
| Pot Pie Crust XIX (protein/leavening) | |
| Flour | 46.0 |
| Soy Protein | 5.77 |
| Salt | 1.5 |
| Calcium Carbonate | 0.23 |
| Dextrose | 2.5 |
| Hydrogenated Shortening | 26.0 |

TABLE 8-continued

| | (% by wt) |
|---|---|
| Water | 18.0 |
| | 100% |
| Pot Pie Crust XX (protein/leavening) | |
| Flour | 45.81 |
| Soy Protein | 5.77 |
| Sodium Bicarbonate | 0.24 |
| Sodium Acid Pyrophosphate | 0.18 |
| Salt | 1.5 |
| Dextrose | 2.5 |
| Hydrogenated Shortening | 26.0 |
| Water | 18.0 |
| | 100% |
| Pot Pie Crust XXI (protein/no leavening/ no additional salt) | |
| Flour | 46.42 |
| Soy Protein | 5.58 |
| Salt | 1.5 |
| Dextrose | 2.5 |
| Hydrogenated Shortening | 26.0 |
| Water | 18.0 |
| | 100% |

The ingredients for each formulation were combined in the following manner. The dry components were weighed and mixed until uniform. The shortening was then folded into the dry mix and stirred until uniform. Then, water was added and thoroughly mixed with the dry mix containing shortening. The resulting dough mass for each formulation was then formed into a circular top crust, added to a conventional 8 oz. pot pie and then stored in a freezer for at least about 48 hours. The frozen pot pies were later removed from storage and cooked in a 600 watt microwave oven for about 9 mins. Optionally the formulations may contain flavoring.

The cooked crust sheets were evaluated for crispness and firmness. The crusts containing soy protein were detectably more crisp than crust XVII having no protein and no leavening agents, crust XVII being watery and lacking firmness. Crust XVIII having soy protein without any leavening agents was judged to be the crispest, most preferred cooked foodstuff. Crust XXI with only protein and no leavening/additional salt was not quite as crispy as XVIII, but still a satisfactory product. Crust XX, with leavening, and crust XIX were judged to be less crispy than crust XVIII, but preferred over crust XVII. Crust XVII was consistently graded as least acceptable.

The above examples and other comparative tests not shown herein demonstrate that an effective amount of a metal ion, i.e., Na, Ca, K (and other alkali or alkaline earth metal ions) and the like metal ions, in conjunction with the protein produces the superior effect of crispiness and organoleptic properties. For instance, Crust XX which contains leavening (and hence Na ions), but no additional Na ions as NaCl (1.5 parts versus 1.75 parts of Crust XVIII) is not judged to be as good as XVIII. In other words, the basicity of leavening and the lesser amounts of Na ion do not provide a crispy or organoleptically acceptable crust as XVIII in this series of examples. Perhaps, the leavening action itself tends to lessen crispiness. Similarly XIX with less salt than XVIII is not as crispy. Crusts XIX and XX are still acceptable products in accordance with this invention. However, it is believed that an effective amount of the Na ion (or Ca, K, etc., metal ions) absorbs microwave energy thereby assisting in the heating of crust to enhance crispiness. The amount of such ions will vary with the composition of the entire crust.

The above comparative runs demonstrate the texture-improving effect obtained by incorporating an effective amount of a protein having low-affinity for water upon storage in microwavable flour-based foodstuffs. Additional experiments not detailed here were conducted wherein specific components of flour-based foodstuff formulations were deleted and the resulting cooked product evaluated. Foodstuffs were prepared deleting only the low water-affinity protein, only the fat component, and only the leavening agent component. When the low water-affinity protein was deleted, the cooked product was mushy and lacking in firmness. Deletion of either the fat or the leavening agent in the presence of the water insoluble protein still resulted in a cooked product which had acceptable texture. Thus, the low water-affinity protein contributed substantially to the acceptable texture of the tested microwaved products. For the above listed foodstuff examples, the protein was incorporated at a level of from about 1% to about 10% by weight based upon the total weight. Because of the wide range of flour-based foodstuffs which may be prepared, the effective level of protein having low affinity for water upon storage may need to be raised or lowered outside the express weight range tested to obtain the desired texture improvement.

Thus, by means of employing a low water-affinity protein upon storage such as a prolamine in an effective amount in a flour-based foodstuff, one can prepare in a microwave oven a cooked foodstuff which has a flaky or crunchy texture without the watery or mushy properties which previously characterized such cooked products. The invention addresses and solves a problem of long-standing duration encountered in the area of microwave cooking. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A flour-based foodstuff consisting essentially of a uniform mixture of flour and a prolamine having low affinity for water upon storage separately added thereto throughout said mixture, said prolamine in an amount adapted to obtain a firm and flaky texture throughout the foodstuff upon cooking from a dough of said foodstuff.

2. The foodstuff of claim 1 wherein said prolamine having low affinity for water upon storage selected from the group consisting of zein, soy isolated, gliadin, hordein and mixtures thereof.

3. The foodstuff of claim 1 for cooking upon the application of microwave energy.

4. The foodstuff of claim 3 further containing a metal ion in an amount effective to absorb microwave energy and enhance the texture.

5. The foodstuff of claim 1 wherein said mixture is storable at freezing temperatures and thereafter immediately microwavable until cooked.

6. The foodstuff of claim 1 wherein said prolamine amount is in the range of about 1% to about 10% by weight based upon total weight of said mixture.

7. A foodstuff which attains a firm and flaky texture upon application of microwave energy comprising flour, an amount of a prolamine effective to attain said firm and flaky texture, and water.

8. The foodstuff of claim 7 further containing a metal ion in an amount effective to absorb microwave energy and enhance the texture.

9. The foodstuff of claim 8 wherein said prolamine amount is in the range of about 1% to about 10% by weight.

10. A microwavable flour-based foodstuff capable of storage at freezing temperatures which upon application of microwave energy immediately after said storage results in a cooked foodstuff having a firm texture throughout said foodstuff, said foodstuff consisting essentially of a uniform mixture of flour and a prolamine having low affinity for water separately added thereto throughout said mixture, said prolamine in an amount adapted to obtain a firm and flaky texture throughout said foodstuff upon cooking from a dough of said foodstuff.

11. The foodstuff of claim 10 further containing a metal ion in an amount effective to absorb microwave energy and enhance the texture.

12. The foodstuff of claim 11 wherein said prolamine having low affinity for water selected from the group consisting of zein, soy isolate, gliadin, hordein and mixtures thereof.

13. foodstuff of claim 12 wherein said prolamine amount is in the range of about 1% to about 10% by weight.

14. The foodstuff of claim 10 selected from the dough group of pizza, biscuit, breading, pie crust.

15. The foodstuff of claim 10 containing a leavening agent.

16. A method of cooking the foodstuff of claim 1 by adding water thereto to make a dough and heating said dough to produce a cooked foodstuff.

17. The method of claim 16 wherein said cooked foodstuff is heated by application of microwave energy.

18. The method of claim 16 comprising storing said dough at freezing temperatures, thereafter placing said frozen dough in a microwave oven and microwaving until cooked.

19. A method of microwaving a flour-based foodstuff by mixing flour and prolamine having low affinity for water upon storage separately added thereto in the presence of water to form a uniform dough, storing said dough at a freezing temperature, placing said frozen dough in a microwave oven and heating by application of microwave energy.

* * * * *